Figure 1:
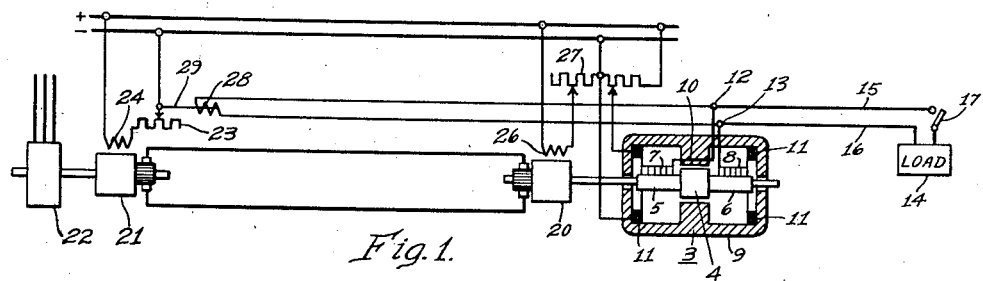

Nov. 2, 1943.                C. LYNN                    2,333,540
                      UNIPOLAR GENERATOR CONTROL
                        Filed March 19, 1942

WITNESSES:                                    INVENTOR
C. J. Weller.                               Clarence Lynn.
                                         BY O. B. Buchanan
                                              ATTORNEY Patented Nov. 2, 1943

2,333,540

UNITED STATES PATENT OFFICE 2,333,540

UNIPOLAR GENERATOR CONTROL

Clarence Lynn, Pittsburgh, Pa., assignor to Westinghouse Electric & Manufacturing Company, East Pittsburgh, Pa., a corporation of Pennsylvania Application March 19, 1942, Serial No. 435,407

5 Claims. (Cl. 171—312)

My invention relates to control-means for large low-voltage, high-current, constant-flux unipolar generators having a time-constant so long that the field-flux cannot be changed by any amount useful or adequate for regulation within the regulating-time required by the load. An example of such a generator would be a 150,000 or 200,000-ampere, 6 or 8-volt generator for pipe-welding, or a 15 or 20-volt, 100,000-ampere generator for an electrolytic load. Such large unipolar generators differ, in a rather remarkable way, from any other known type of generator, in regard to the extremely long time required to change the useful magnetic flux of the generator after making a change in the exciting current on the field-winding of the generator. Thus, in an ordinary large generator, the time-constant may be of the order of 1½ to 2 seconds for an 80% build-up of the field, whereas a large unipolar generator would require something like 5 or 10 minutes. Whereas an ordinary generator would respond to a 10% variation in the field-current within a fraction of a second, a large unipolar generator of the type to which my invention applies would not finish making its response to a 10% field-current-change for 20 to 30 seconds, more or less, during which time the voltage of the machine would be very, very gradually changing. The inadequacy of this sort of response will be appreciated when it is known that these large unipolar generators are utilized in industrial plants wherein long strips of work are passing through the welding machine, or through the electrolytic apparatus, which is energized by the generator, at a speed measured in many feet per minute or in some cases in feet per second, and that the characteristics of the weld, or the thickness of the electroplating, as the case may be, is naturally dependent upon the current, so that a reasonable uniformity of product requires a much faster regulation than can be obtained with field-current control.

Heretofore, such large unipolar generators have been provided with compensating windings, for compensating for the demagnetizing armature-reaction, and in some cases special compounding windings have been utilized for slightly compounding the machine, and an elaborate operating-technique has been developed which has made it possible to operate such a machine with a regulation which has been usable. Smaller unipolar generators stand on a different footing, because there the time-constant is quite appreciably smaller, and it has been possible to regulate these machines in a more or less conventional manner, using field-flux control, these small unipolar generators not needing compensating windings because of the fact that it was possible to rely upon field-current control to compensate for the armature reaction, as well as for any other variables requiring regulations. In such small, non-compensated or variable-flux unipolar generators, it has also been suggested, heretofore, to supplement the field-flux control of the unipolar generator with a means for controlling the speed of the motive-means which drives the unipolar generator, but such speed-control means was not relied upon for use in lieu of a means for changing the magnetic flux in the unipolar generator.

In connection with the large-sized unipolar generator to which my present invention relates, a need has arisen for a better regulation than could be obtained by the utilization of compensating windings, with adjustments by cumulative or bucking series field-turns, or a special operating-technique for handling the machine and the load-apparatus which is fed by the machine; and one of the places where this need or urgency for some reliable control-means exists is in installations where two or more of these large unipolar generators must be paralleled with each other for supplying additional current-capacity for the purpose of either carrying heavier work or operating the previous work (pipes or sheet-iron) at a higher speed so as to increase production. When two of these large unipolar generators are paralleled, particularly if there should happen to be even a slight amount of compounding in either one of them, there would be a tendency for one of the generators to gradually "hog" the load, by the cumulative effect of gradually, in the course of many minutes, taking a little more and more of the load, gradually increasing its field-flux, and taking still more of the load, until that generator becomes overloaded, whereas the other generator becomes underloaded; a condition which could not be tolerated because such generators operate at substantially the limit of their safe loading within the limitations of a reasonable life and the necessary factor of safety against breakdowns or failures. While it would be possible, of course, to correct for any such slow change in the load-division, by manual adjustments on one or both of the paralleled generators, which could be worked out as a part of the previously mentioned operating-technique, it is obviously desirable to eliminate as much as possible of the need for such constant attendance or surveillance. Hence the parallel operation of two or more of these large unipolar generators constitutes a need, and an urge, for a reliable means for automatically regulating the current- or voltage-output of these large machines.

It is an object of my present invention to provide a large, compensated, low-voltage, high-current, constant-flux, long-time-constant unipolar generator with a regulator which is responsive to the output-voltage or the output-current or any other electrical quantity of the output of the generator, and to provide a variable-speed motive-means for driving the generator at a speed which is controlled by the regulator. More specifically, it is an object of my invention to utilize speed-variation as a means for controlling the division of load between two large unipolar generators of the type stated.

Figure 2:
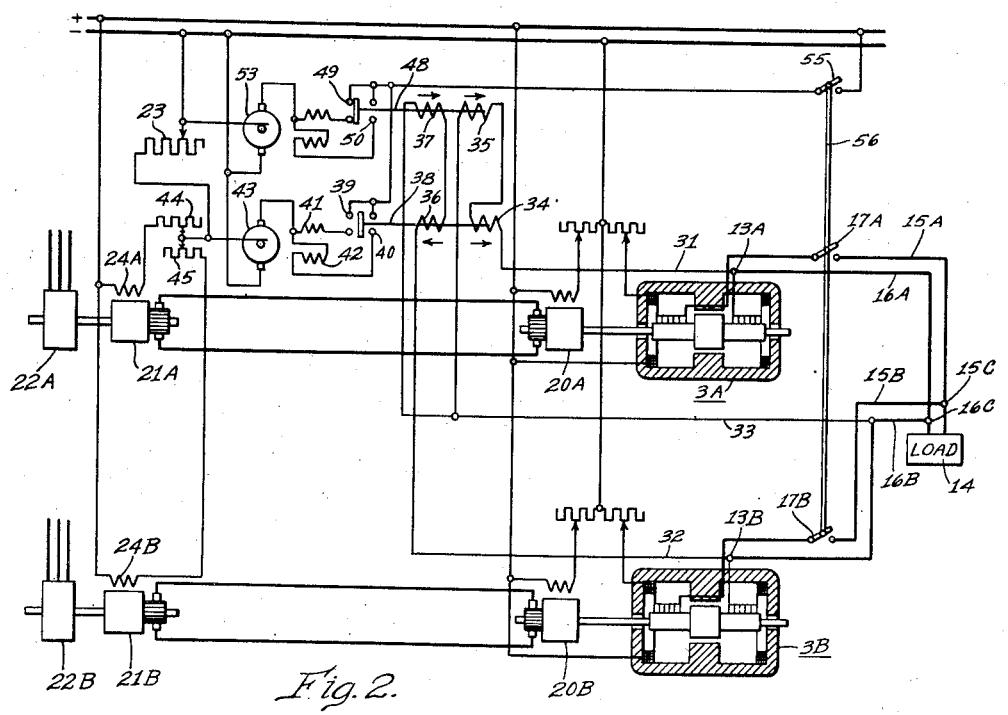

With the foregoing and other objects in view, my invention consists in the parts, combinations, structures, systems and methods hereinafter described and claimed, and illustrated in the accompanying drawing, wherein:

Figure 1 is a diagrammatic view of circuits and apparatus illustrating my invention in connection with a regulator for holding the output-voltage of a large unipolar generator constant by means of speed-control; and Fig. 2 is a similar view illustrating the application of my invention to a speed-control regulation for maintaining a predetermined division of current between two large unipolar generators operating in parallel, and also illustrating the application of my invention in connection with a current-regulator for maintaining a constant total current-output of the two parallel generators.

In Fig. 1, I have schematically indicated a large unipolar generator 3 of the type which I have previously discussed, the same comprising a rotating armature 4, two current-collecting cylinders 5 and 6, each having a brush-rigging 7 and 8, respectively, and a field-magnet structure 9, the machine being compensated by having the terminal-conductors from one set of brushes 7 pass through the pole-face portions of the field-structure, as indicated at 10. The field-magnet structure 9 is substantially constantly excited by an exciting winding 11 which is energized from a direct current bus (+) and (−). The two terminals 12 and 13 of the unipolar generator are connected to the load 14 through massive copper buses 15 and 16, respectively, one of which contains a switching-device 17.

As shown in Fig. 1, the unipolar generator 3 is driven by a direct-current motor at 20 which, in turn, is energized from the generator 21 of a motor-generator set which is illustrated as comprising an alternating-current motor 22. The motor 20 which drives the unipolar generator is a variable-speed motor, the speed of which is regulated by controlling the voltage generated by the generator 21, as by means of controlling a field-rheostat 23 in series with the field-winding 24 of this generator, the field-winding 24 being energized from any suitable direct-current source indicated by the terminals or buses (+) and (−). The variable-speed motor 20 may be operated, if desired, at a constant field-excitation, by which I mean that its field-current is not, or need not be, varied as a part of the automatic regulation to which my invention relates. Thus, I have illustrated the variable-speed motor 20 as having a field-winding 26 which is operated from the direct-current bus (+) and (−) through a preset rheostat 27.

In accordance with my invention, I provide a regulating-means which is responsive to some electrical output-quantity of the unipolar generator 3. In Fig. 1, I have diagrammatically shown, for this purpose, a voltage-regulator 28 in the form of a coil which is connected across the output-terminals 12 and 13 of the unipolar generator, for the purpose of holding this voltage constant or in accordance with any other predetermined law of operation with respect to voltage. The voltage-regulator 28 may be of any desired type, and it may be connected to the field-rheostat 23 of the generator 21 of the motor-generator set in any desired manner, as by means of a mechanical or an electrical connection, which is schematically indicated at 29 in Fig. 1, so that, when the output-voltage of the unipolar generator 3 varies from its predetermined amount, the voltage-regulator 28 makes an adjustment of the field-excitation of the constant-speed direct-current generator 21, which in turn varies the voltage which is applied to the constantly-excited variable-speed motor 20 which drives the unipolar generator, decreasing the speed of the generator when the output-voltage thereof begins to get too high, and increasing its speed when the output-voltage begins to get too low.

The feasibility of the control-method just described, in connection with Fig. 1 will be appreciated when it is realized that, notwithstanding the inertia of the large unipolar generator 3 and the driving-motor 20 therefor, a speed-change of approximately 10% (corresponding to approximately 10% voltage-change) can be accomplished in from 1 to 2 seconds or less, by changing the field of the direct-current generator 21 in the manner just described. This operation should be compared to the time of approximately 20 to 30 seconds which might be required to change the output-voltage of the unipolar generator by approximately 10% through the medium of changing the field-current of the field-winding 11 of the unipolar generator.

In Fig. 2, I have shown a different application of my invention, in a control-system involving two unipolar generators 3A and 3B, which have their buses 15A—16A and 15B—16B connected together at the load, as indicated at 15C and 16C. The two unipolar generators 3A and 3B are separately driven, each by its own variable-speed driving-motor 20A and 20B, respectively, each of these driving-motors being energized from its own variable-voltage generator 21A and 21B, respectively. The two variable-voltage generators 21A and 21B are driven at an approximately constant speed, by any suitable means, two alternating-current motors 22A and 22B being shown for this purpose, although it will be readily understood that the two variable-voltage generators 21A and 21B could (and usually would) be mounted on the same shaft and driven from a single motor.

In Fig. 2, I make use of a current-responsive regulation, both for the purpose of holding the total output-current of the two unipolar generators constant, and for the purpose of maintaining a predetermined ratio for the load-division between the two unipolar generators. The response to hundreds of thousands of amperes of direct current presents some special problems. Ordinary current-shunts are out of the question because of the necessity for obtaining at least a fraction of a volt from such a shunt, in order to have enough voltage to energize an ordinary shunt-type current-responsive relay or regulator, because, say, 300,000 amperes, passing through a shunt having a ½-volt-drop, would produce a heating loss of 150 kilowatts, which is too much for any shunt. The magnitude of 300,000 amperes can perhaps be appreciated better, when it is realized that it takes buses aggregating a cross-section of over two square feet to carry the current, operating the copper of the buses at a light loading of 1000 amperes per square inch, in order to keep down the voltage-drop, or energy-loss, in the bus-bars.

In the particular installation which is shown in Fig. 2, I have assumed that each of the bus-bars 15A, 16A, 15B and 16B has a length approximating fifty feet, which would give an over-all bus-bar drop of approximately 0.4 volt per bus, which I utilize in lieu of a shunt, as a means for obtaining a response to the currents flowing in the two buses 16A and 16B. Thus, I connect relay-circuit conductors 31, 32 and 33, respectively, to the machine-terminal 13A, the machine-terminal 13B and the load-point 16C. I utilize the conductors 31 and 33 to obtain a current responsive to the output of the unipolar generator 3A, passing this current through two current-responsive coils 34 and 35, and I utilize the conductors 32 and 33 for obtaining a current responsive to the output of the unipolar generator 3B, passing this current through two current-responsive coils 36 and 37.

In the control-system shown in Fig. 2, I utilize the two current-coils 34 and 36 differentially to energize a normally centered differential relay 38, which responds to any departure of the currents, from a predetermined ratio, to close either one of two make-contacts 39 and 40, which are utilized to energize either the forward-running field 41 or the backward-running field 42 of a regulator-motor 43 for simultaneously and oppositely adjusting two small pilot-regulators 44 and 45, respectively, one in series with the field-winding 24A of the variable-voltage generator 21A, and the other in series with the field-winding 24B of the variable-voltage generator 21B.

In the form of embodiment of my invention which is shown in Fig. 2, I utilize the two current-coils 35 and 37 cumulatively to energize a current-responsive relay 48 so as to be responsive to the total current-output of the two unipolar generators 3A and 3B. The current-relay 48 is of a type capable of making either an undercurrent contact 49 or an overcurrent contact 50 for energizing a regulator-motor 53 in the proper direction for automatically adjusting the field-rheostat 23 which is placed in the common supply-circuit for the field-currents of both of the variable-voltage generators 21A and 21B. It will be understood that the current-regulator 48—53 is typical of any desired type of regulator, of any desired refinement of accuracy.

In the operation of the system shown in Fig. 2, it will be perceived that the load-current which is supplied to the load 14 can be held to a constant value, or in accordance with any other law of regulation, as by means of the current-regulator 48—53, so that the field-current (and hence the voltage) of each of the generators at 21A and 21B is reduced when the total output-current of the two unipolar generators tends to increase above the aforesaid predetermined value, thus reducing the operating-speeds of both of the unipolar generators, and vice versa when the total output-currents of the two unipolar generators tends to decrease below the predetermined value. In like manner, the differential regulator 38—43 serves to automatically compensate for any tendency of one or the other of the two unipolar generators 3A and 3B to gradually begin to take more than its proper share of the total output-current, this control being obtained by responding, as sensitively as may be desired, to any departure from a predetermined current-ratio between the output-currents of the two unipolar generators, to make a slight adjustment in the speeds of the two generators, slightly increasing the speed of the underloaded generator, and slightly reducing the speed of the overloaded generator, thus nipping in the bud, so to speak, any tendency of either generator to "hog" the load.

In order to deenergize the current-regulator 48—53 at times when the two unipolar generators 3A and 3B are disconnected from their load 14, by the opening of the load-switches 17A and 17B, respectively, I have shown an auxiliary control-switch 55 in circuit with the regulator-motor 53 which controls the main speed-control rheostat 23, so that the speeds of the two unipolar generators 3A and 3B remain constant during the no-load periods of their operation. Preferably, as shown, both of the regulator-motors 53 and 43 are deenergized by the auxiliary relaying switch 55. The three switches 17A, 17B and 55 are, of course, to be operated simultaneously, as is diagrammatically indicated by a cross-tie-bar 56 joining these three switches together.

While I have illustrated my invention in two different forms of embodiment, involving voltage-regulation, current-regulation, and current-division for parallel operation, I wish it to be understood that each of these three methods of control may be utilized alone, or that the parallel-operation control may be utilized with either manual output-control or automatic current- or voltage-responsive output-control, and that the various control-means illustrated ought to be regarded as typical of any means for responding to any predetermined electrical quantity of the output of the unipolar generator or generators to maintain that quantity either constant or in accordance with any predetermined function or law of operation, and that the various automatic regulators illustrated are to be understood to be diagrammatic representations of typical regulators which may include all of the safeguards and structural details which are known in the regulator-art in general. I desire that my appended claims may be accorded the broadest interpretation consistent with their language.

I claim as my invention:

1. In combination, a compensated, low-voltage, high-current, constant-flux unipolar generator having a compensating winding and having a time-constant so long that the field-flux cannot be changed by any amount useful for regulation within the regulating-time required by the load, motive-means for driving the unipolar generator, a regulator responsive to an electrical quantity of the output of the unipolar generator for responding to departures of said electrical quantity from a predetermined law of regulation, and means responsive to the regulator for causing a speed-variation in the motive-means in a direction and amount suited for making a compensation for any tendency of said electrical quantity to depart from said predetermined law of regulation.

2. In combination, two parallel-operated low-voltage, high-current, approximately constant-flux unipolar generators having a time-constant so long that the field-flux cannot be changed by any amount useful for regulation within the regulating-time required by the load, separately regulable motive-means for driving the respective unipolar generators, a regulator responsive to the division of output-current between the two unipolar generators for responding to departures of said current-division from a predetermined law of regulation, and means responsive to the regulator for causing a speed-variation in the motive-means in a direction and amount suited for making a compensation for any tendency of said current-division to depart from said predetermined law of regulation.

3. In combination, two parallel-operated compensated, low-voltage, high-current, constant-flux unipolar generators, each having a compensating winding and having a time-constant so long that the field-flux cannot be changed by any amount useful for regulation within the regulating-time required by the load, separately regulable motive-means for driving the respective unipolar generators, a regulator responsive to the division of output-current between the two unipolar generators for responding to departures of said current-division from a predetermined law of regulation, and means responsive to the regulator for causing a speed-variation in the motive-means in a direction and amount suited for making a compensation for any tendency of said current-division to depart from said predetermined law of regulation.

4. In combination, a compensated, low-voltage, high-current, constant-flux unipolar generator having a compensating winding and having a time-constant so long that the field-flux cannot be changed by any amount useful for regulation within the regulating-time required by the load, motive-means for driving the unipolar generator, a regulator responsive to the output-voltage of the unipolar generator for responding to departures of said output-voltage from a predetermined law of regulation, and means responsive to the regulator for causing a speed-variation in the motive-means in a direction and amount suited for making a compensation for any tendency of said output-voltage to depart from said predetermined law of regulation.

5. In combination, a compensated, low-voltage, high-current, constant-flux unipolar generator having a compensating winding and having a time-constant so long that the field-flux cannot be changed by any amount useful for regulation within the regulating-time required by the load, motive-means for driving the unipolar generator, a regulator responsive to the output current of the unipolar generator for responding to departures of said output-current from a predetermined law of regulation, and means responsive to the regulator for causing a speed-variation in the motive-means in a direction and amount suited for making a compensation for any tendency of said output-current to depart from said predetermined law of regulation.

CLARENCE LYNN.